United States Patent [19]

de Munck et al.

[11] Patent Number: 4,647,594

[45] Date of Patent: Mar. 3, 1987

[54] POLYPHENYLENE ETHER COMPOSITIONS HAVING IMPROVED IMPACT AND ESCR

[75] Inventors: Johannes W. J. de Munck, BJ Huybergen; Johannes H. G. M. Lohmeijer, GV Hoogerheide, both of Netherlands

[73] Assignee: General Electric Company, Selkirk, N.Y.

[21] Appl. No.: 786,379

[22] Filed: Oct. 10, 1985

[30] Foreign Application Priority Data

Oct. 10, 1984 [NL] Netherlands ............................ 8403075

[51] Int. Cl.[4] ........................ C08F 14/00; C08F 36/00
[52] U.S. Cl. .................................... 521/146; 521/150; 524/157; 525/68; 525/92; 525/905
[58] Field of Search ................ 524/157; 521/146, 150; 525/92, 68, 905

[56] References Cited

U.S. PATENT DOCUMENTS

| | | | |
|---|---|---|---|
| 4,304,881 | 12/1981 | Aoki et al. | 525/92 |
| 4,529,761 | 7/1985 | Lohmeijer | 524/157 |

*Primary Examiner*—Jacob Ziegler
*Attorney, Agent, or Firm*—Michael J. Doyle

[57] ABSTRACT

The properties of polymer mixtures which comprise a polyphenylene ether and a polyvinyl aromatic compound can be improved by the simultaneous addition of an organic metal sulphonate compound and a block copolymer. In particular a combination of a good impact strength and a good resistance against agressive media under mechanical stresses (environmental stress) cracking resistance "ESCR") is obtained. This also applies to polymer mixtures having a high content of titanium dioxide.

6 Claims, No Drawings

POLYPHENYLENE ETHER COMPOSITIONS HAVING IMPROVED IMPACT AND ESCR

The invention relates to a polymer mixture comprising the following constituents:
(A) a polyphenylene ether;
(B) a polyvinyl aromatic compound, and
(C) a sulphonate of the formula $(R-SO_3)_nX$, wherein R is an alkyl radical or aralkyl radical having 5-25 carbon atoms, X is an alkali metal ion or an alkaline earth metal ion, and n=1 or 2.

European Patent Application No. 0,107,835 (U.S. Pat. No. 4,529,761) discloses a polymer mixture which comprises a polyphenylene ether and a polyvinyl aromatic compound to which a sulphonate is added to improve the resistance to agressive media under stress, the so-called "environmental stress crack resistance" abbreviated as ESCR. The known mixtures have a good ESCR and a good impact strength.

It has been found that the ESCR and the impact strength can be further improved by the addition of a sulphonate and a block copolymer.

The polymer mixture according to the invention is characterized in that it comprises in addition a block copolymer A-B, A-B-A or $A_mB$, wherein A is a block derived from a vinyl aromatic compound and B is a block derived from a conjugated compound, and m=2 or 3.

Polymer mixtures which comprise a polyphenylene ether, a polyvinyl aromatic compound and a block copolymer are known per se. For this purpose reference may be made to, for example, the U.S. Pat. Nos. 4,196,116; 4,239,673; 4,242,263; 3,639,508. The addition of a block copolymer of the above-mentioned type generally does not lead to an improvement of the ESCR; sometimes even to a deterioration of the ESCR. It has now been found quite unexpectedly that the presence of a sulphonate and a block copolymer shows a synergistic effect with respect to the ESCR.

The improvement of the ESCR due to the presence of a sulphonate and a block copolymer also occurs in polymer mixtures which comprise special polyvinyl aromatic compounds, for example, high-impact polystyrene having a core shell structure. These special polystyrene types lead to a high notch impact value, but polymer mixtures which have these polystyrene types generally have a low ESCR. The invention provides polymer mixtures having a particularly good notch impact value in combination with an acceptable ESCR.

The invention may also be used for polymer mixtures which, in addition to the above-mentioned constituents A, B, C and D, comprise a pigment, for example, titanium dioxide. In general, a high content (of approximately 10% by weight) of titanium dioxide in a polymer mixture which comprises a polyphenylene ether and a polyvinyl aromatic compound leads to a less favourable value for the notch impact value and the ESCR.

The polymer mixture according to the invention preferably comprises 0.5-5.0, even more preferably 1-5 parts by weight of sulphonate C and 0.5-10, even more preferably 2-5 parts by weight of block copolymer D per 100 parts by weight of A+B. As a block copolymer is preferably used a styrene-butadienestyrene block copolymer having a styrene content of 25-35% by weight, having a butadiene content of 65-75% by weight, in which the styrene block has a molecular weight of 5,000 to 20,000 and the block copolymer itself has a molecular weight of 50,000 to 150,000. The polymer mixture according to the invention may comprise 0.5-20 parts by weight of titanium dioxide per 100 parts by weight of A+B. As a polyvinyl aromatic compound B the polymer mixture according to the invention may comprise a high-impact polystyrene based on a butadiene rubber having a core-shell structure.

The polymer mixture according to the invention comprises at any rate the above-mentioned constituents A, B, C and D. In addition, the polymer mixture may comprise further constituents.

A. Polyphenylene ether

Polyphenylene ethers are compounds which are known per se. For this purpose reference may be made to the U.S. Pat. Nos. 3,306,874; 3,306,875; 3,257,357 and 3,257,358. Polyphenylene ethers are usually prepared by an oxidative coupling reaction—in the presence of a copper amine complex—of one or more two- or three-fold substituted phenols, homopolymers and copolymers, respectively, being obtained. Copper amine complexes derived from primary, secondary and/or tertiary amine may be used. Examples of suitable polyphenylene ethers are:
poly(2,3-dimethyl-6-ethyl phenylene-1,4-ether)
poly(2,3,6-trimethylphenylene-1,4-ether)
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene 1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene 1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example, copolymers derived from two or more phenols as used in the preparation of the above-mentioned homopolymers, are also suitable. Furthermore graft copolymers and block copolymers of vinyl aromatic compounds, for example polystyrene, and of a polyphenylene ether as described above are also suitable.

B. Polyvinyl aromatic compounds

As a polyvinyl aromatic compound may be used a compound which is formed from more than 25 mol. % of units of a compound of the formula $R-C(C_6H_{(5-p)}Z_p)=CH_2$, wherein R is a hydrogen atom, a lower alkyl group (having, for example, 1-6 carbon atoms) or a halogen atom, Z is a hydrogen atom or a chlorine atom or a lower alkyl group or a vinyl group, and p=0 or an integer from 1-5. The rubber-modified high-impact polyvinyl aromatic compounds are also suitable. Examples of polyvinyl aromatic compounds are homopolymers, for example, polystyrene itself, polychlorostyrene and poly-alphamethylstyrene, rubber-modified polystyrenes, for example, the commercially available high-impact polystyrene polymers and also the styrene-containing copolymers, for example, styrene-acrylonitrile copolymers, styrene-butadiene copolymers, styrene-acrylonitrile-butadiene terpolymers, copolymers of ethyl vinyl benzene and divinyl benzene, and the like.

A so-called core-shell high-impact polystyrene may be used in the polymer mixtures according to the invention as a polyvinyl aromatic compound. This core-shell high-impact polystyrene is described in WO 82/02208; it is commercially available as type Polystyrene KR 2791 of BASF. This type of polystyrene compounds comprises a discontinuous phase consisting for the greater part of a core of polystyrene with an enveloping shell of a diene rubber diaphragm. It is also referred to as high-impact polystyrene modified with a rubber phase in the form of capsules. When this type of high-impact polystyrene is mixed with a polyphenylene ether, a polymer mixture having a good impact strength is obtained. The ESCR of the said mixtures is subject to improvement. Polymer mixtures according to the invention comprising the just-mentioned high-impact polystyrenes and a sulphonate C and a block copolymer D, have an acceptable ESCR in combination with a good notch impact value.

C. Sulphonate

The polymer mixtures according to the invention comprise a sulphonate of the formula $(R-SO_3)_nX$, wherein R is an alkyl radical or an aralkyl radical having 5-25 carbon atoms, X is an alkali metal ion or an alkaline earth metal ion, and $n=1$ or 2. X is preferably a sodium ion, in which case $n=1$. Suitable sulphonates are the following commercially available products:

$C_{12-20}H_{25-40}SO_3Na$ (Hostastat HS 1);

$C_xH_{2x+1}SO_3Na$ (Atmer 190) en $C_{12}H_{25}-C_6H_4-SO_3Na$ (Maranil A).

D. Block copolymer

The polymer mixture according to the invention comprises a block copolymer A-B; A-B-A or $A_mB$, in which A is a block derived from a vinyl aromatic compound and B is a block derived from a conjugated diene compound, and $m=2$ or 3. Suitable vinyl aromatic compounds are, for example, styrene, alpha-methylstyrene, vinyl toluene, vinyl xylene, vinylnaphthalene or mixtures of such compounds. Suitable conjugated diene compounds are, for example, butadiene, isoprene, 1,3-pentadiene, 2,3-dimethyl butadiene or mixtures of such compounds. The block copolymers may be so-called linear diblock copolymers or linear triblock copolymers. They may also be starblock copolymers. The block copolymers may be partly hydrogenated. The blocks of the block copolymer may be directly coupled together or may be coupled together via a random copolymer of a vinyl aromatic compound and a conjugated diene compound (so-called tapered block copolymers). A linear triblock copolymer of the type styrene-butadiene-styrene which is not hydrogenated is preferably used. The above-mentioned block copolymers are known per se and are widely used in polymer mixtures which comprise a polyphenylene ether and a polyvinyl aromatic compound to improve the mechanical properties of such mixtures. The synergistic effect of this type of block copolymer in combination with sulphonate to improve the ESCR is new and surprising.

In addition to the above-mentioned constituents, the polymer mixtures according to the invention may still comprise further constituents, for example: additives to improve the flame-retarding properties, stabilizers, pigments and dyes, fillers, reinforcing fibres, antistatics, mineral oil and softeners. Of the pigments, titanium dioxide is mentioned in particular. The presence of comparatively large quantities of titanium dioxide (of, for example, 10 parts by weight of titanium dioxide per 100 parts by weight of A+B) generally leads to a comparatively low notch impact value and a comparatively low ESCR. In combination with the constituents C and D, the polymer mixtures according to the invention, also when they comprise comparatively much titanium dioxide, have a good notch impact value and a good ESCR.

The invention will be described in greater detail with reference to the following specific examples.

EXAMPLE I, COMPARATIVE EXAMPLES A, B, AND C

Four polymer mixtures were prepared starting from a polyphenylene ether (PPE: poly-(2,6-dimethyl-1,4-phenylene) ether having an intrinsic viscosity of 0.48 dl/g measured in toluene at 25° C.) and a high-impact polystyrene (HIPS having a polybutadiene content of 95% with a cellular morphology). The following usual additives were always added per 100 parts by weight of polyphenylene ether plus polystyrene: organic phosphate 10 parts by weight; titanium dioxide 12.5 parts by weight; organic phosphite 0.5 parts by weight; ZnO+ZnS 0.3 parts by weight; remaining constituents 1.05 parts by weight.

The polymer mixture according to the comparative example A comprised no constituents C and D; in comparative example B 2.0 parts by weight of sulphonate, namely $C_{12-20}H_{25-40}SO_3Na$ (Hostastat HS 1 of Hoechst) were added, in comparative example C 3.0 parts by weight of a block copolymer were added. In example I 2.0 parts by weight of the said sulphonate and 3.0 parts by weight of the same block copolymer were added. As a block copolymer was used a non-hydrogenated linear styrene-butadiene-styrene block copolymer having a styrene content of 28% by weight, a butadiene content of 72% by weight, a molecular weight of the styrene block of 11,000 and a molecular weight of the triblock copolymer of 80,000.

The compositions thus obtained are recorded in Table A below. The polymer mixtures were prepared by mixing the individual constituents in a Werner-Pfleiderer WP 28 extruder (adjusted temperature on an average 280° C., flow rate 10 kg/hour, 300 r.p.m.). The resulting extrudate was chopped to pieces. Test bars were manufactured from the resulting pieces by injection moulding. The following properties of the test bars were determined: the notch impact value according to Izod, the yield strength and the ESCR.

The ESCR value was determined as follows. Test bars were manufactured (by injection moulding) according to ASTM type 1 as they are used for the determination of the tensile strength according to ASTM D 638. Three or more bars per polymer mixture were manufactured. The bars were clamped in a metal curved jig so that the bars on their outside were elongated by 0.85%. At instant zero the bars, clamped in the jig, were dipped in tri-N-butyl phosphate. The time (in minutes) to complete fracture was measured. The average of the resulting values was computed.

The properties found are also recorded in Table A below.

From the values of Table A it may be seen that a sulphonate C and a block copolymer D show a synergistic effect with respect to the ESCR. This is the more surprising when the ESCR values of the comparative examples A and C are compared with each other: The addition of only a block copolymer does not result in improvement of the ESCR, possibly even to a decrease thereof.

TABLE A

|  | Comparative Examples | | | Example |
|---|---|---|---|---|
|  | A | B | C | I |
| Composition (parts by weight) | | | | |
| PPE | 35 | 35 | 35 | 35 |
| HIPS | 65 | 65 | 65 | 65 |
| Phosphate | 10 | 10 | 10 | 10 |
| Titanium dioxide | 12.5 | 12.5 | 12.5 | 12.5 |
| Phosphite | 0.5 | 0.5 | 0.5 | 0.5 |
| ZnO + ZnS | 0.3 | 0.3 | 0.3 | 0.3 |
| Remaining constituents | 1.05 | 1.05 | 1.05 | 1.05 |
| Sulphonate | — | 2.0 | — | 2.0 |
| Block copolymer | — | — | 3.0 | 3.0 |
| Properties | | | | |
| Notch impact value (J/m) | 175 | 200 | 265 | 260 |
| Yield strength (MPa) | 44 | 43 | 42 | 40 |
| ESCR (min.) | 6.0 | 31.0 | 5.4 | 46.1 |

EXAMPLE II AND COMPARATIVE EXAMPLE D

In these two examples, polymer mixtures were prepared which comprise a special type of high-impact polystyrene instead of the usual type as used in the previous examples; in these examples a core-shell high-impact polystyrene was used as described in WO 82/02208 (BASF KR 2791). The further constituents and the method used were identical to the previous examples.

The composition of the formed polymer mixtures and the properties thereof found are recorded in Table B hereinafter.

The values in the table show that the polymer mixtures according to the invention permit of obtaining a particularly good notch impact value in combination with a reasonable ESCR.

TABLE B

|  | Comparative example D | Example II |
|---|---|---|
| Composition (parts by weight) | | |
| PPE | 35 | 35 |
| HIPS | 65 | 65 |
| Phosphate | 10 | 10 |
| Titanium dioxide | 12.5 | 12.5 |
| Phosphite | 0.5 | 0.5 |
| ZnO + ZnS | 0.3 | 0.3 |
| Remaining constituents | 1.05 | 1.05 |

TABLE B-continued

|  | Comparative example D | Example II |
|---|---|---|
| Sulphonate | — | 2.0 |
| Block copolymer | — | 3.0 |
| Properties | | |
| Notch impact value (J/m) | 215 | 380 |
| Yield strength (MPa) | 50 | 43 |
| ESCR (min.) | 3.4 | 19.3 |

We claim:

1. A polymer mixture having improved impact strength and environmental stress crack resistance comprising a mixture of:
   (A) a polyphenylene ether;
   (B) a polyvinyl aromatic compound;
   (C) a sulphonate of the formula $(R-SO_3)_nX$, wherein R is an alkyl radical or aralkyl radical having 5 to 25 carbon atoms, X is an alkali metal ion or an alkaline earth metal ion, and n=1 or 2; and
   (D) a block copolymer of the A-B, A-B-A, or $A_mB$, wherein A is a block derived from a vinyl aromatic compound and B is a block derived from a conjugated diene compound, and m=2 or 3 and wherein said sulphonate (C) and said block copolymer (D) are present in amounts effective for improving the impact strength and environmental stress crack resistance of said polymer mixture.

2. A polymer mixture as claimed in claim 1, characterized in that the mixture comprises 0.5–5.0 parts by weight of sulphonate C and 0.5–10 parts by weight of block copolymer D per 100 parts by weight of A+B.

3. A polymer mixture as claimed in claim 1, characterized in that the polymer mixture comprises as a block copolymer a styrene-butadiene-styrene block copolymer having a styrene content of 25–30% by weight, having a butadiene content of 70–75% by weight, the styrene block having a molecular weight of 5,000 to 20,000 and the block copolymer itself having a molecular weight of 50,000 to 150,000.

4. A polymer mixture as claimed in claim 3, characterized in that the polymer mixture comprises 1–3 parts by weight of sulphonate C and 2–5 parts by weight of block copolymer D.

5. A polymer mixture as claimed in claim 1, characterized in that the polymer mixture moreover comprises 0.5–20 parts by weight of titanium dioxide per 100 parts by weight of A plus B.

6. A polymer mixture as claimed in claim 1, characterized in that the polymer mixture comprises a high-impact polystyrene based on a butadiene rubber having a cellular structure as a polyvinyl aromatic compound.

* * * * *